Patented Nov. 1, 1949

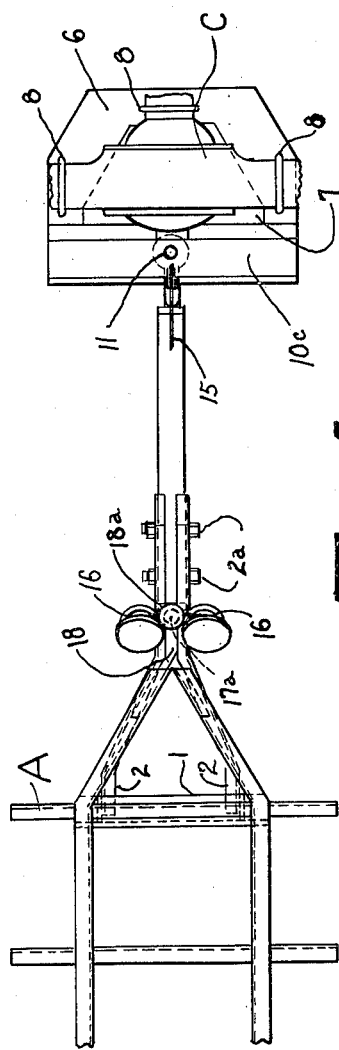

2,486,605

UNITED STATES PATENT OFFICE 2,486,605

AXLE TRAILER CONNECTOR

Reuel O. Ladd, Elmira, N. Y.

Application October 17, 1947, Serial No. 780,491

5 Claims. (Cl. 280—33.9)

My invention is a novel device for connecting a trailer to the rear axle of a towing vehicle.

The primary object of this invention is to provide a device for coupling a trailer to a towing vehicle in a manner which will not impair the riding comfort and steering qualities of the vehicle.

Another important object of my invention is the provision of a device that will pull the trailer without surging because the pull is exerted in a straight line from the car axle to the trailer axle.

A still further object of my invention is to provide a device that will eliminate the trailer side sway produced by the double steering of the trailer resulting from connecting the trailer several feet behind the rear axle or on the rear bumper of the car.

Still another object of this invention is the provision of a device that will insure easy riding of the trailer, because road shocks are absorbed in the shock absorber assembly.

Other objects of my invention are the elimination of the need for helper springs in the towing vehicle; easy adaptability to various vehicles and trailers; an unshiftable connection to the axle of the vehicle; a convenient method of coupling the pull-bar at the axle bracket; easy adjustment of the length of the pull-bar; and a generally rugged and durable construction.

Other minor objects of my invention will become apparent in the description of the accompanying drawings wherein:

Fig. 1 is a plan view showing the connector unit attached between the trailer chassis and the rear axle differential housing of the towing vehicle.

Fig. 2 is a side elevation corresponding to Fig. 1 but partially cut away to show the method of attaching the coupling ring to the tow bar.

Fig. 3 is a sectional view through the shock absorber along line 3—3, Fig. 2.

In a practical embodiment of my invention an angle bar 1 is fixed to the chassis A of the trailer B. Pivotally joining plate 1 with yoke arms 2 are pins 1ª mounted therethrough. A pull-bar tube 3 is held between the yoke arms 2 by bolts 2ª and is adjustable in length to set the distance between the trailer and the towing vehicle. A coupling ring 4 and tongue thereon is secured in the end of tube 3 by plug 5, the plane of the ring being horizontally disposed.

A bracket 6, adapted to engage differential housing C, is cut out as at 7 to pass the lower hemisphere of the housing and is held to the axle housings and the connecting rod housing by U-bolts 8 and nuts 9. Welded to a downwardly extending flange 6ª from the rear of bracket 6 is a coupling frame 10, comprising three horizontal shelves 10ª, 10ᵇ and 10ᶜ drilled through to receive a vertically disposed pin 11, adapted to hold in coupled relation between the lower two shelves 10ª and 10ᵇ the coupling ring 4. A washer 12 is fixed to the pin 11 and a spring 13 compressed between washer 12 and the upper shelf 10ᶜ urges the pin downwardly and into engagement with the coupling ring.

Attached to washer 12 and extending up and over pulley 14 is a cord 15, which, when pulled, raises the washer 12 and attached pin 11, thus disengaging the pin 11 from the slot between shelves 10ª and 10ᵇ and allowing the trailer to be disconnected from the towing vehicle. The pin 11 acts also as a pivot between the trailer and towing vehicle, thus allowing articulated motion therebetween.

Disposed in upright position on each side of the pull-bar assembly and attached to yoke arms 2 are shock absorbers 16, Fig. 3, comprising a pair of arcuated cylindrical tubes plugged at each end with plugs 16ª and slotted along their adjacent sides to receive therethrough lugs 17 carrying a ball 17ª which engages a socket 18ª on the foreward end of projecting member 18 rigidly mounted to form an extension of trailer chassis A. The upper plug 16ª on each cylinder 16 is removable for maintenance purposes. Within the arcuated cylinders are axially disposed oppositely acting springs 19 operatively engaging lugs 17 to give a shock absorbing action, the upper and lower sections of the springs being opposed in action and yieldably holding the lugs 17 in centered position, thus supporting the forward end of the trailer chassis.

In operation, the shock absorbers 16 provide comfortable riding of the trailer by absorbing road shocks that tend to be transmitted from vehicle to trailer as a result of road bumps acting on the vehicle and trailer at different times.

The pin 11 may be raised by pulling cord 15, thereby facilitating engagement and disengagement of the coupling ring carried on the end of the pull-bar. Adjustment of the length of the pull-bar and thereby the separation between the trailer and the towing vehicle is accomplished by the telescoping joint in the pull-bar, the adjustment being fixed by bolts 2ª.

I do not limit my invention to the exact form shown in the drawing, for, obviously, changes may be made within the scope of the claims.

I claim:

1. A hitch for connecting a trailer to a towing vehicle, comprising a pull-bar; a horizontal pivot connecting the inner end of the pull-bar to the chassis of the trailer intermediate the ends thereof; shock absorbing means connecting the chassis and pull-bar forward of said pivot for yieldably supporting the forward end of said chassis; and means for pivotally connecting the outer end of the pull-bar to said towing vehicle, said shock absorbing means including one or more arcuated cylinders mounted on the pull-bar with their centers of curvature coinciding with said horizontal pivot; said cylinders having slots therein; and lugs mounted by a ball and socket joint on the outer end of the trailer chassis and extending through said slots into said cylinders; and opposed springs in each cylinder yieldably urging said lugs into centered positions along the axis of each cylinder.

2. In a hitch as set forth in claim 1, each cylinder having a fixed plug in its lower end; and a removable plug in its upper end.

3. A hitch for connecting a trailer to a towing vehicle, comprising a pull-bar; a horizontal pivot connecting the inner end of the pull-bar to the chassis of the trailer intermediate the ends thereof; shock absorbing means connecting the chassis and pull-bar forward of said pivot for yieldably supporting the forward end of said chassis; and means for pivotally connecting the outer end of the pull-bar to said towing vehicle, said connecting means including a bracket plate adapted to fixedly engage the rear axle and differential housings of the towing vehicle; a hole in said plate for receiving the lower hemisphere of the differential housing; U-bolts extending through said plate and clamping from above the axle housings and the connecting rod housing of the towing vehicle, respectively; a flange at the rear end of said plate; and means secured to said flange for pivotally connecting thereto a ring on the outer end of said pull-bar.

4. In a hitch as set forth in claim 3, said pivotal connecting means, comprising a frame having upper and lower horizontal transverse slots, the forward end of said frame being secured to the flange of said bracket; a vertically disposed pin passing through aligned holes in said frame and extending through said slots; a washer fixed to said pin and adapted to lie on the lower surface of the upper slot; and a spring in the upper slot around said pin yieldably urging said washer and pin downwardly, said lower slot being adapted to receive the coupling ring on the outer end of said pull-bar.

5. In a hitch as set forth in claim 4, a cord attached to said washer and passing over a pulley on the frame disposed above said washer adapted to raise the washer and pin out of engagement with the lower slot to permit coupling or uncoupling of the trailer.

REUEL O. LADD.

REFERENCES CITED

The following references are of record in the file of this patent:

UNITED STATES PATENTS

| Number | Name | Date |
|---|---|---|
| 773,537 | Boese et al. | Nov. 1, 1904 |
| 2,142,749 | Graves | Jan. 3, 1939 |